Aug. 2, 1966 P. BARATOFF 3,263,954
ALL-DIRECTIONAL SHOCK MOUNT
Original Filed Nov. 15, 1963
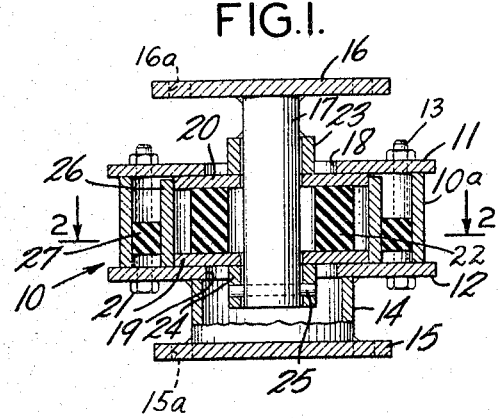
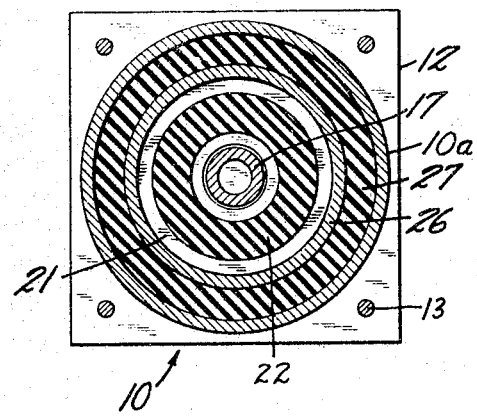
INVENTOR
PAUL BARATOFF
BY
Brumbaugh, Free, Graves &
Donohue
HIS ATTORNEYS

3,263,954
ALL-DIRECTIONAL SHOCK MOUNT
Paul Baratoff, Jackson Heights, N.Y., assignor to Korfund Dynamics Corporation, Long Island City, N.Y., a corporation of New York
Original application Nov. 15, 1963, Ser. No. 323,978. Divided and this application Oct. 11, 1965, Ser. No. 494,802
2 Claims. (Cl. 248—358)

This is a division of application Serial No. 323,978, filed November 15, 1963.

This invention relates to shock mounts and in particular, to an improved form of all-directional shock mounts capable of attenuating severe shock forces.

Shock mounts that incorporate shock absorbing members formed of an elastomer or similar resilient material, are often constructed by bonding one or more metallic elements of the mount to the resilient members to enable them to attenuate both compression and tension forces. Bonded compressible elements, limited to the strength of the bond, are inherently incapable of accommodating large tension shock loads. Thus there has existed a need for an all-directional shock mount assembled from conventional resilient members and metal parts which do not require special treatment, such as bonding, and which can accommodate large vertical and horizontal tension and compression forces over long periods.

The present invention satisfies these need by providing shock mounts that include resilient shock absorbing members disposed to attenuate shock loads from all directions, the displacement of a supported equipment subjecting the members only to compressive forces, and the movements of the equipment additionally being opposed and attenuated not only by internal inherent damping of elastomer material, but also by friction between elements within the shock mount.

More particularly, according to the invention a typical shock mount includes a pair of resilient shock absorbing members formed, for example, of rubber or other elastomer, one of which is subjected to compressive stresses when the supported load moves vertically, and the other being partially compressed by movement of the load horizontally. Compression of the first shock absorbing member may be effected by means of a pair of plates on its opposite sides, each of the plates being movable in one direction to compress the shock absorbing member between them and attenuate all vertical shock loads. The second shock absorbing member, preferably disposed concentrically with the first shock absorbing member, attenuates all horizontal shock loads.

In one form of the invention the shock absorbing members may be mounted in a housing which slidably and frictionally engages the plates compressing the members, so that shock loads are at least partially attenuated by friction.

For a better understanding of the present invention reference may be had to the accompanying drawings, in which:

FIGURE 1 is a view in vertical section of a shock mount embodying the present invention; and FIGURE 2 is a sectional view of the shock mount shown in FIGURE 1 taken along the line 2—2 of FIGURE 1 looking in the direction of the arrows.

Referring to a typical embodiment of the invention with reference to FIGURES 1 and 2, a shock mount includes a housing 10 formed by a ring 10a clamped between and concentric with the center of upper and lower aligned plates 11 and 12 secured together by bolts 13. A collar 14, enclosed at its lower end by a base plate 15, is welded to the lower plate 12 to complete the housing 10.

A support or mounting plate 16, to which equipment may be secured for isolation from shock, is welded to a vertically movable shaft 17 extending into the housing 10 through vertically aligned apertures 18 and 19 formed in the centers of the upper and lower plates 11 and 12. The vertically aligned apertures are of substantially greater diameter than the shaft 17 which protrudes therethrough.

Horizontal annular plates 20 and 21, disposed within the housing 10, are vertically slidable on the shaft 17. Each of the annular plates 20 and 21 has a diameter exceeding the diameter of the apertures 18 and 19, thereby closing the aperture with which it is associated. The annular plates 20 and 21 are spaced vertically from each other by a shock absorbing ring 22 formed of an elastomer such as rubber, for example, compressed between the plates. An upper ring 23 welded to the shaft 17 and a lower ring 24 secured on the opposite end of the shaft 17 by a roll pin 25, limit the vertical movement of the annular plates 20 and 21 to the portion of the shaft between the rings 23 and 24.

A horizontally slidable collar 26 in the housing 10 engages the peripheries of the annular plates 20 and 21 and rests on the inner surface of the lower plate 12. The slidable collar 26 is spaced from the ring 10a by a closely fitted resilient shock absorbing ring 27 formed of rubber or some other elastomer.

In a typical operation of the shock mount, equipment is fastened to the mounting plate 16 by bolting it through holes 16a and the shock mount secured to a desired base by bolts through holes 15a in the base plate 15. Compressive shock loadings tending to drive the housing 10 upwardly are transmitted from the base plate 15 through the collar 14, the lower plate 12 and the annular plate 21 to the shock absorbing ring 22 where the forces are attenuated. The applied shock loadings compress the annular shock absorbing member 22, which will transmit only greatly reduced forces through the annular plate 20, the upper ring 23 and the shaft 17 to the support plate 16.

Forces placing the support plate 16 and the housing 10 in tension are transmitted through the shaft 17, the lower ring 24 and the annular plate 21 to compress the shock absorbing ring 22 against the annular plate 20 and the upper plate 11 of the housing 10, thereby attenuating tension forces.

Horizontal shock loadings are attenuated by the annular shock absorbing member 27 and the frictional forces in the housing 10. Specifically, a horizontal shock force applied to the housing 10 is attenuated between the ring 10a and the shaft 17 by compression through the collar 26 of a portion of the shock absorbing ring 27 and by the frictional forces between the slidable collar 26 and plates 20 and 21 and the plates 11 and 12.

The load rate of the resilient shock absorbing members shown in FIGURES 1 and 2 can be varied to a desired value not only by using elastomers of different hardness, but also by drilling in them a desired number of suitably sized vertical or horizontal holes. Of course the stiffness of the resilient shock absorbing members also affects the load rate of the shock mounts.

As is apparent from the foregoing, the present invention provides an all-directional shock absorbing device in which the imposed shock loadings are attenuated by both elastic compression and friction forces.

It will be understood that while representative embodiments of the present invention have been shown and described for purposes of illustration, modifications thereof will occur to those skilled in the art. Therefore, the invention is not to be limited to the specific apparatus disclosed herein but is to be defined by the appended claims.

I claim:
1. A shock mount comprising a housing, a support plate spaced vertically from the housing, a shaft extending from the support plate into the housing, spaced upper and lower plates slidably mounted on the shaft in the housing, a first resilient shock absorbing ring to attenuate vertical shock loads disposed between and engaging the upper and lower plates, stops on the shaft limiting the upward movement of the upper plate and the downward movement of the lower plate with respect to the shaft, a slidable collar surrounding and engaging the peripheries of the upper and lower plates, a second resilient shock absorbing ring to attenuate horizontal shock loads effectively disposed between and engaging the collar and the housing, whereby the first resilient shock absorbing ring attenuates by compression thereof all vertical shock loads between the support plate and the housing, and the second resilient shock absorbing ring attenuates by compression thereof all horizontal shock loads between the shaft and the housing.

2. A shock mount as defined in claim 1, wherein the first resilient shock absorbing ring urges the upper and lower plates to frictionally engage the housing, whereby the frictional engagement of the upper and lower plates with the housing attenuates horizontal shock loads between the shaft and the housing.

References Cited by the Examiner

UNITED STATES PATENTS

| | | | |
|---|---|---|---|
| 2,660,386 | 11/1953 | Munro | 248—21 |
| 2,660,387 | 11/1953 | Roy | 248—21 |
| 3,145,012 | 8/1964 | Kfoury | 248—358 |

CLAUDE A. LE ROY, *Primary Examiner.*

J. PETO, *Assistant Examiner.*